United States Patent [19]
Messman et al.

[11] 4,074,130
[45] Feb. 14, 1978

[54] LABELED CONTAINER ORIENTATION PROCESSOR

[75] Inventors: Leonard A. Messman, Brookfield Center; Harold C. Wooding, Jr., Trumbull; Glenn C. Waehner, Riverside, all of Conn.

[73] Assignee: United Technologies Corporation, Hartford, Conn.

[21] Appl. No.: 645,725

[22] Filed: Dec. 31, 1975

[51] Int. Cl.² .......................................... B65G 47/24
[52] U.S. Cl. .............................. 250/223 R; 198/374; 198/394; 250/223 B; 356/198
[58] Field of Search .................... 356/198; 250/223 B, 250/223 R; 178/DIG. 36; 198/374, 394

[56] References Cited
U.S. PATENT DOCUMENTS

| | | | |
|---|---|---|---|
| 3,415,350 | 12/1968 | Murphy | 250/223 B |
| 3,580,380 | 5/1971 | Phillips | 250/223 B |

*Primary Examiner*—Vincent P. McGraw
*Attorney, Agent, or Firm*—M. P. Williams

[57] ABSTRACT

A non-interlaced video camera has twenty four light pipes orthogonally terminated at its field of view, each light pipe having a lens at its distal end focused at a spot on one of a plurality of spinning, labeled bottles. For each of the spinning bottles, the vidicon camera output is quantized, stored, and compared repetitively, over successive cycles, with an 8-bit pattern of four digital "dark" bits followed by four digital "white" bits, a match indicating that a label edge has passed a sensing station several cycles previously so that the bottle may be stopped in a desired position following a settable delay. Video threshold and successive samplings ensure integrity of stored data; processing hardware is time shared; digital timing synchronizes processing with the vidicon camera; and a cursor aids initial alignment. Data which changes modulo 192 is stored in a preloaded memory (RAM) modulo 193, advancing data in each cycle group in a caterpillar fashion, in a last-in/first-out basis. As to each bottle during each cycle, the reading in of new data is instantaneously followed by read out of such new data along with data acquired in seven previous cycles corresponding to seven previous incremental angular displacements of the bottle as it is turning.

In a second embodiment, photodetectors replace the light pipes and vidicon camera; a serial memory replaces the RAM; and label patterns are sensed, with optional "don't care" bits.

7 Claims, 10 Drawing Figures

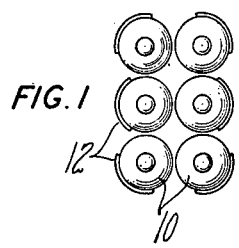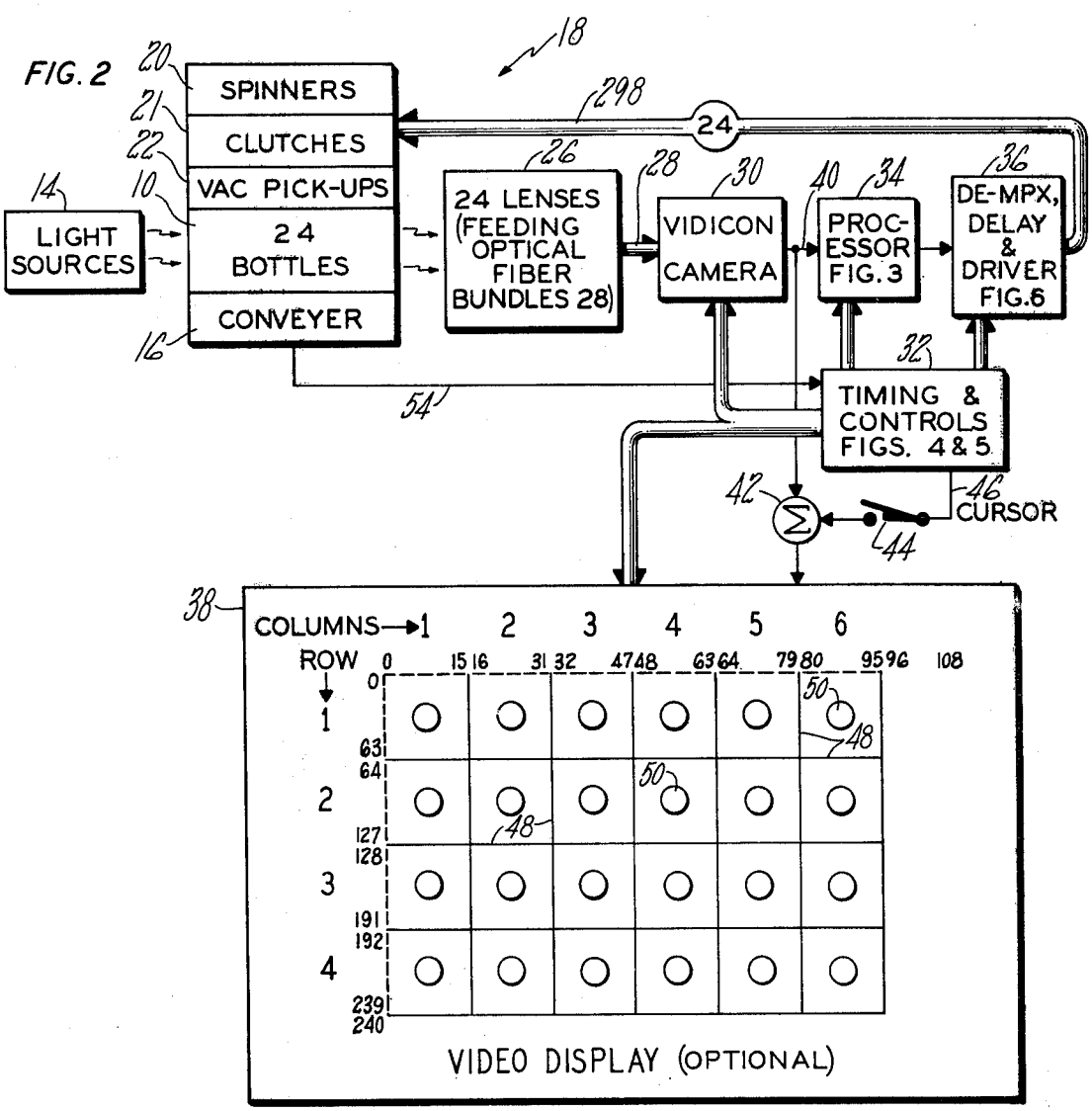

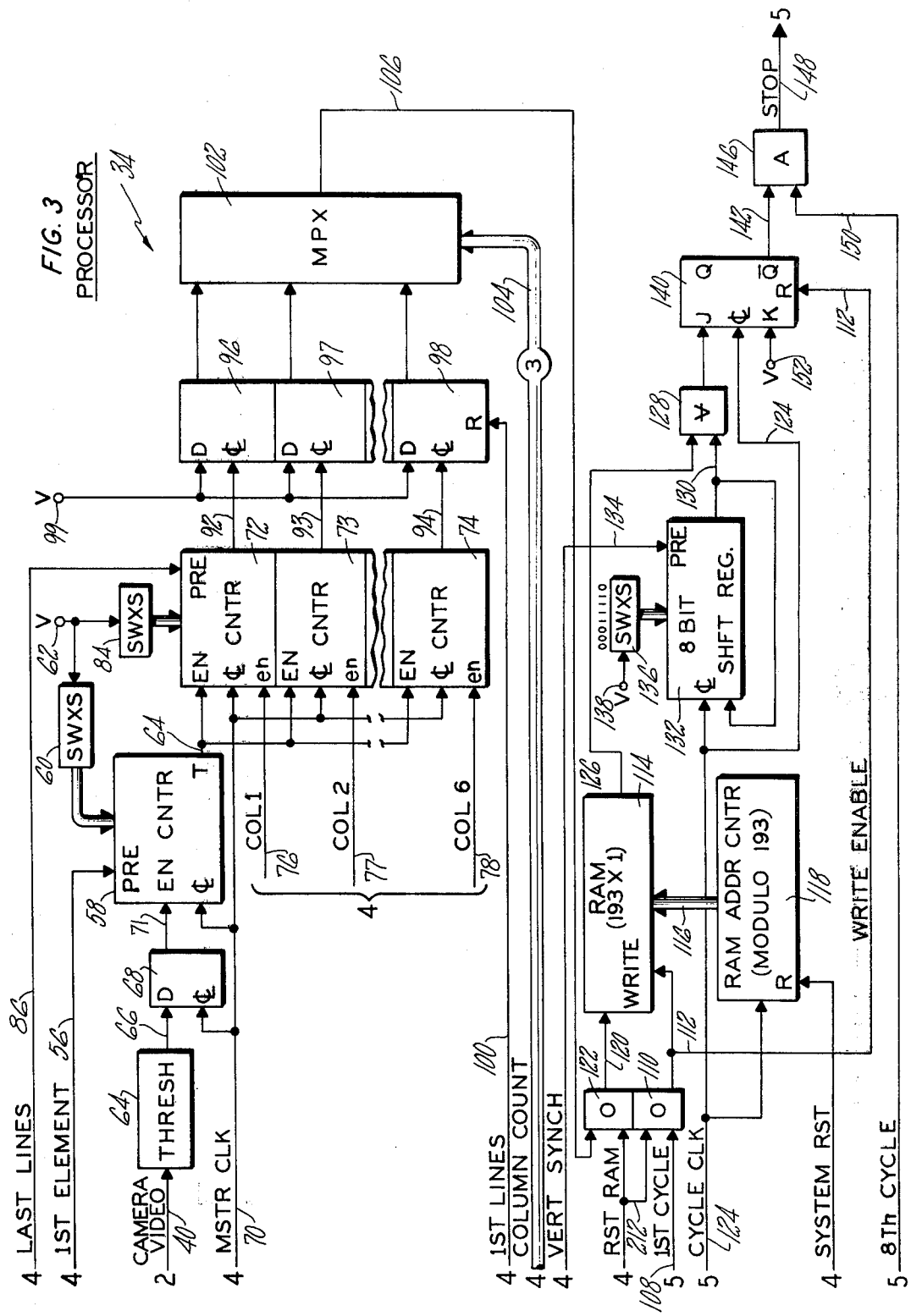

LABELED CONTAINER ORIENTATION PROCESSOR

BACKGROUND OF THE INVENTION

1. Field of the Invention

This invention relates to electroptic processing, and more particularly to video detection of the orientation of labels on rotating containers utilizing digital processing and control techniques.

2. Description of the Prior Art

As an adjunct in consideration of the predication of the present invention, consider various well-known packaging and display practices of beverage bottles and cans, such as for soft drinks and beer. As is known, beverage bottles and cans are frequently marketed in cluster packages, such as the well-known six-pack, and the emerging two-pack of larger containers. The well-known six-pack may be a cardboard wrap, in which the ends are open; or it may be High-cone (TM), in which cans are held together by a thin molded network of soft plastic; or in clear wrap, in which the containers are wrapped in a plastic which is then shrunk so as to grip them. In the latter two cases, there is no labeling of the cluster package, other than labeling on the individual containers therein; in the case of the cardboard wrap, cluster package labeling appears from a side view, but end view labeling is limited to the labeling on the individual containers. Quite obviously, since most round container labels (particularly bonded paper labels) cover only 120° of the container periphery, there is a more than fifty percent chance that full product identification will not be readable on at least some of the containers when the cluster package is disposed on a shelf for viewing by consumers. It is therefore desirable and advantageous to rotate the containers before assemblage in the cluster package to ensure that any container labels which are to be used for product identification while on the display shelf are rotated in such a fashion that the labels bearing product identification will be clearly visible to the consumer.

When orienting labels, the containers may be preclustered on the packaging machine and may be rotated the desired amount prior to arriving at the first packaging station. The container should be viewed in some fashion while being rotated, and the rotation ceased when the viewing apparatus detects that the package is in the proper position. The techniques of gripping and rotating containers have been well known for many years in the package handling arts. However, the technology of viewing and of processing resulting has heretofore left much to be desired. For instance, the technology for utilizing normal white light, which thereby permits the use of relatively inexpensive and highly available television-type equipment, is most advantageous; on the other hand, optical considerations — such as reflections from minor flaws, changes in ambient light as a result of surrounding procedures, transients from many different sources and the like — create difficulties in producing signals in response to ordinary white light. Additionally, the economics of beverage packaging are extremely critical; although it is certainly conceivable that a minicomputer could process any form of signal applied to it and determine when a bottle was oriented, the cost of such a computer relative to the production rate of packaging of six-packs and the like would be prohibitive, since the bottles would have to time share the computer, thereby reducing production rates below those which are permissible, or several computers would have to be used in order to properly orient the member containers in a cluster package such as a six-pack.

SUMMARY OF THE INVENTION

The object of the present invention is to provide improvements in detecting the orientation of labels on rotating containers.

According to the present invention, rotating containers arranged in position or assemblage in a cluster package are viewed by an optical system, and the resulting electrical signal output is sampled to provide video signals indicative of whether corresponding spots being viewed are deemed to be bright or dark. In one embodiment, the image of a spot on each of the rotating containers is transmitted to a specific, corresponding area within the field of view of a vidicon camera, employing an aspect of the invention which provides different images to different areas of a theoretically-segmented vidicon camera; the video derived from the sweeping of the vidicon camera is detected as either bright or dark under control of electronic processing equipment which synchronizes successive elements of the video in each sweep across each area of the vidicon camera with identity of the related, individual container; a data signal indicating a bright spot is generated when successive scans of the vidicon camera indicate a determined, threshold number of bright spots within the related area of the vidicon camera; otherwise data indicating a dark spot is provided. On another embodiment, individual photocells are used for each of the containers (instead of vidicon camera), each individual photocell output, which has a sufficient magnitude to indicate brightness, resulting in a bright data bit, according to the invention.

According further to the invention, binary bits representing bright or dark are stored in sequence as they are generated, repetitively, in successive cycles, each cycle representing brightness or darkness of spots on the containers at corresponding successive angular positions, so as to provide, in storage, a continuously updated history of the brightness and darkness of a number of spots on the container as the container has rotated a significant portion of a revolution; this history of data items is, in each cycle, compared against a desired pattern of data items that will indicate when the bottle has reached a known position; although the disclosed embodiment illustrates video and pattern data items which are several bits long but only one bit wide, in apparatus which senses a label edge, the disclosed apparatus is readily expanded to data items of a plurality of bits relating to each angular position and a pattern having a corresponding series of data items of plural bit width for each angular position, within the invention.

According still further to the present invention the modulus of the storage device (that is, the number of cyclically addressed storage areas) is caused to be one storage area greater than the number of currently-retained data items (including one data item per container in each cycle for as many cycles of history as is required for comparison with the desired pattern), whereby the stored data is automatically, continuously updated by the newest data item for any container, supplanting, in the same position, the oldest data item (many cycles previously) for that container. This provides a last-in/first-out memory. In the illustrative embodiments herein, 192 items are stored in 193 areas of the random access memory (RAM), and 1536 items are stored in a 1536 stage shift register, respectively.

In accordance further with the invention, the storage of data relating to the rotating containers is accomplished either in a cyclically addressed RAM or in a simple, serial memory (of the shift register type) in which the data is continuously recirculated, new data being steered into the pattern of data relating to each container, thereby supplanting old data relating to that container, in each cycle (each circulation of the serial memory). In one form, this aspect of the invention comprises a shift register having as many storage positions as there are items in the pattern times the number of containers, plus one additional storage position to affect the modulus difference referred to hereinbefore.

In accordance further with the invention, at the start of processing of signals relating to any particular group of containers, the memory which stores data items relating to brightness and darkness for comparison with the pattern is preloaded with data all of one kind whereby it becomes immaterial as to whether all containers are locked at at orientations which initially present data items of one kind followed by data items of the other kind, or vice versa. In the illustrative embodiments herein, the memory is preloaded with ONEs.

In accordance with the invention still further, the pattern of data with which the incoming and stored video data relating to the containers is compared, may be associated with a pattern of "dont't care" bits in which the success (or lack thereof) of comparison between the pattern and the stored data is thought to be unreliable, and is therefore ignored.

According to the present invention, light images relating to a plurality of different objects are presented to distinct, respective areas of a field of view of a vidicon camera which is scanned in a fashion such that each scan line intersects a plurality of the areas, successive groups of scan lines intersecting the same group of areas, and other groups of scan lines intersecting other groups of areas; each scanning of the vidicon camera providing video signals which are threshold detected to determine a magnitude indicative of sufficient brightness to generate a related bright data signal for storage; the bright signals in each scan line of the vidicon are stored for the respective areas, and when a determined number of bright signals have been stored for one scan line of one area, a bright line signal is stored for that area; after scanning all of the lines of a given area (along with lines of the related group of areas), if a sufficient number of bright line signals have been stored, a bright data signal is generated for further storage with respect to the corresponding object. Thus, each bright data item in storage signifies sufficient data bright signals in each scan line of a sufficient number of bright lines so as to assuredly determine that the image of the related object is bright during that scan of the vidicon camera.

According further to the present invention, rotating containers arranged in position for assemblage in a cluster package are viewed by an optical system which presents electric signals of the intensity of light at a spot on each of the rotating containers to a specific area within the field of view of a vidicon camera; the video derived from sweeping the vidicon camera is detected as either bright or dark, successive elements of video being counted for each sweep across each area of the vidicon camera relating to each individual container; data indicating that a sufficient number of bright elements (in contrast with dark elements) is stored; other areas of the vidicon tube are similarly scanned and the determination of whether the related spot on each container is considered to be bright or dark is similarly stored; the process is repeated continuously for all of the containers, each scan of the vidicon relating to all of the containers in the cluster, successive scans of the vidicon relating to incremental positions of all of the containers as they rotate.

According to the invention, the modulus of a cyclically repetitive storage is one greater than the modulus of all of the individual items of data stored therein for comparison with a pattern, such as items relating to a cluster package of a plurality of rotating containers, to provide a last-in/first-out capability, and each time that a data item is stored relating to the brightness and darkness of the currently-viewed point on a rotating package, it and similar data acquired in a number of previous cycles (equal to the number of data items in the pattern to be recognized) are instantaneously and sequentially read out for comparison with the pattern such that identification of the pattern need not await delayed batch processing of the information. This in turn further provides for relative ease of utilization of a relatively small amount of processing equipment for a relatively large number of packages, whereby the cost of processing equipment for a given production rate of containers is maintained at a minimum.

According further to the present invention, the storage arrangement is such that it is immaterial whether the bottle or the label is showing (that is, whether the initial data represents bright or dark) as processing is established, since in all instances, the memory has ultimate data prestored therein (such as brightness) and must pass through a period of storing data of the opposite sense (such as darkness) followed by a period of storing data of the same sense (brightness) before a detection of the label edge is possible. This avoids any need to synchronize, in any fashion, the initial label position with the ultimate processing and label edge detection.

According still further to the invention, the vidicon camera, connected to digital processing equipment, is also connected to a display device which is provided with a video cursor by the processing equipment, so as to permit centering the video brightness relating to all of the images being processed through the vidicon camera within a cursor generated by the digital timing of the processor, whereby to ensure that the spatial alignment of the vidicon camera is, through its vertical and horizontal synchronizing signals derived from the digital clock, spatially synchronized with the timing of the digital clock and therefore with the electronic processing of the video data which results therefrom.

According to the present invention, rotating containers arranged in position for assemblage in a cluster package are viewed by an optical system, and resulting video signals indicative of whether corresponding spots being viewed are deemed to be bright or dark are processed by equipment synchronized to the optical system by a digital clocking means. In one embodiment, sweeping of a vidicon camera is, under control of the digital clock which synchronizes successive elements of the video in each sweep across each area of the vidicon camera with identity of the related, individual container; in another embodiment, individual photocell outputs are processed under control of the digital clock. In the invention, binary bits representing bright or dark are processed serially in sequence as they are generated in repetitive, successive cycles, the identity of groups of bits relating to specific containers being maintained by a digital clock which controls the optical sensing system.

According further to the present invention, the images of spots on each of the rotating containers transmitted to specific, corresponding areas within the field of view of a vidicon camera, and video derived is by sweeping the vidicon camera in a non-interlaced fashion; this doubles the information rate with improved restoration and provides spatial isolation for improved operation.

According still further to the present invention, rotating containers arranged in position for assemblage in a cluster package are viewed by an optical system, the video derived therefrom in successive cycles relating to incremental positions of all of the containers as they rotate, is processed to provide an indication that a particular spot on a label has passed the sensing station (and that therefore the bottle can be stopped a known fraction of a revolution from such detection) which is delayed an amount relating to the difference in angular position of the sensing station and desired rotary position for each container before stopping the container. In the invention the delay can vary from one container to another in the cluster; and, viewing stations can be located conveniently at different respective positions.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 1 is an illustrative, tip plan view of a six-pack of bottles oriented for visible display of the labels thereon;

FIG. 2 is a schematic block diagram of a first embodiment of the present invention, incorporating a vidicon camera;

FIG. 3 is a schematic diagram of the processor, that is, the data flow portion, of the embodiment of FIG. 1;

DESCRIPTION OF THE PREFERRED EMBODIMENT

Figure 4:
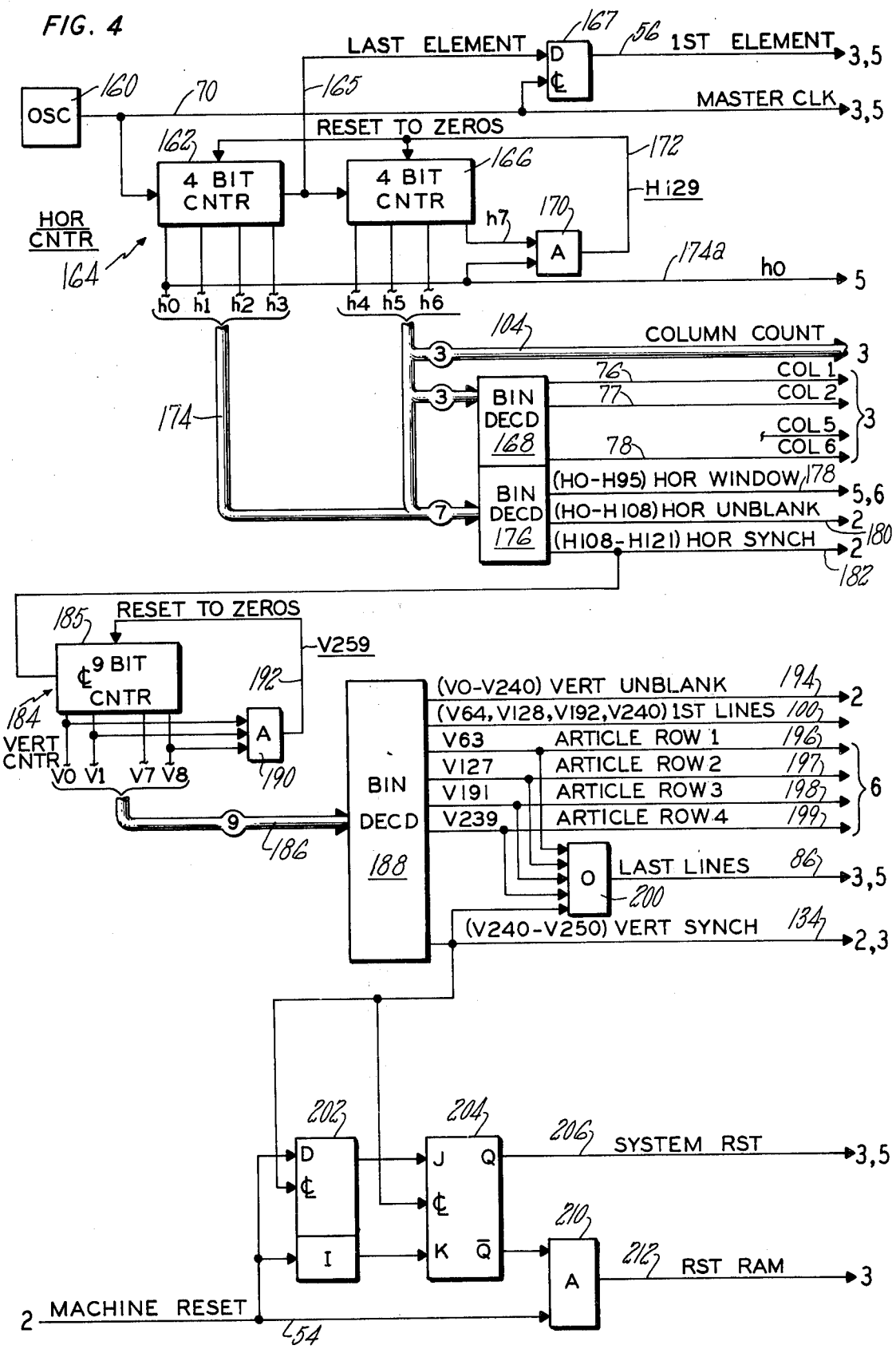
FIG. 4 is a schematic block diagram of timing control circuitry, particularly a digital clock and signals derived directly therefrom, for the embodiment of FIG. 1.

Referring now to FIG. 1, a cluster of containers, such as bottles 10, each have a label extending approximately ⅔ of the way around its peripheral surface. The bottles 10 are shown positioned with a desired mutual orientation such that the labels of the two center bottles are pointing orthogonally from the side of the bottle cluster, and the labels of the end bottles are pointing at roughly 45° with respect to the cluster. This provides a high degree of product identification from the label information alone, whether the cluster be viewed from the end or the side, which facilitates marketing of the cluster of bottles in clear plastic wrap without any further product identification on the wrapper. However, in the embodiment of the invention described hereinafter, the ultimate positions of the labels is virtually immaterial, since each bottle is stopped at a point determined by a settable delay which defines the amount of rotation to be imparted to the bottle after the label edge is sensed. Therefore, the end bottles may all be oriented with their labels pointing orthogonal to the ends of the cluster so as to permit viewing of the bottle label information when the cluster is packaged in an open-end cardboard wrap. Similarly, the inherent nature of the invention makes it useful to accommodate virtually any bottle orientation configuration.

Further, although six bottles are described with respect to FIG. 1 as representative of but one well-known cluster arrangement, the six-pack, the invention can readily handle two-packs, four-packs, eight-packs and the like. In fact, the embodiment of the invention described hereinafter is arranged to handle four six-packs at one time, thus providing a high production rate with but a single, relatively simple apparatus.

Referring now to FIG. 2, 24 bottles 10 are illuminated by simple light sources 14 as they are advanced along a path in a packaging machine by conveyors 16. At some point along the path, an assembly 18, carrying twenty-four spinners 20 attached by clutches 21 to vacuum pick-ups 22, is lowered over the bottles so that the bottles may be raised just enough to provide clearance from the conveyor, so that with the clutches engaged, the spinners can rotate the bottles. At this point, the bottles are spaced in clusters of six in preparation for being wrapped in six-packs. However, the relative, rotative orientation with respect to each other is completely random. The apparatus 16–22 is of any suitable type well known in the package handling art, forms no part of the present invention, and therefore is not described further herein.

There are twenty-four optical sensing stations 26 consisting of lenses, feeding optical fiber bundles 28, and if necessary, mirrors for altering the direction of light, which focus on points on the periphery of the bottle, across which the surface area of the bottle (and ultimately of the label on each bottle) will pass as the bottles are rotated by the spinners 20. Preferably, the optical stations 26 are mounted on the assembly 18 as are the light 14, so that the assembly 18 may engage bottles and move forwardly with them along the conveyor a sufficient time to properly orient all of the bottles, after which it raises so as to disengage from those bottles, returns rapidly along the conveyor to a subsequent grouping of bottles and engages them, and again follows the bottles along the conveyor for a period of time sufficient to properly orient all of them. However, this depends upon the particular mechanical arrangements for handling the bottles, and forms no part of the invention; it suffices that each of the twenty-four optical sensing stations 26 be responsive to light of the sources 14 reflecting from the bottles 10 as they are rotated so that the positions of the labels may be detected. In the present embodiment, the leading edge of the label, in the direction of the spinning of the bottle, is taken as the point of detection of the presence of the label; therefore, in this embodiment the label edge is detected by a solid string of dark indications followed by a solid string of light indications. This implies, in part, a dark bottle having a light label thereon; but it is also achievable, in part, by arrangement of the light with respect to the optical sensing station 26, such that specular reflection (mirror-light reflection) of the light from the bottles is directed away from the optical stations 26, whereas diffuse reflection (which is minimal at the bottle surface and large at the rough label surface) has significant components directed toward the optical stations 26. As is described in a commonly owned copending application entitled OPTICAL APPARATUS FOR SENSING CLUSTERED PACKAGE ORIENTATION, Ser. No. 645,590, filed on even date herewith by J. M. Gordon, this selective reflection characteristic may be achieved by locating the light sources above the label with the optical sensing stations 26 located more or less on the same vertical plane as the point being sensed on the labels, such that specular reflection is downward, below the optical sensing stations 26, whereas the diffuse reflection (having significant horizontal components) will present significant light to the optical sensing stations 26.

The output of the vidicon camera is, in the usual fashion, a time varying signal of video during each of many horizontal scans contained within each frame or vertical scan. In the present embodiment, there are 240 active horizontal scans (in addition to blanked lines) for each frame in a non-interlaced raster which is controlled by digital clock signals provided by the timing and control circuitry 32 of FIG. 4, which also controls the processor 34 (as is described more fully with respect to FIGS. 3 and 4 hereinafter) and the demultiplex delay and driver circuitry 36 of FIG. 6, which in turn controls deactivation of the clutches 21 to permit the bottles to stop in a desired relationship to the sensing of the label edge. If desired, and particularly for purposes of initial alignment of the system, a video display 38 may be provided; although it should be understood that the video display 38 performs no function (other than initial alignment) having anything to do with the bottle orientation of the present invention.

The vidicon camera output is supplied on a line 40 to the processor (as is described more fully hereinafter), and is also supplied to a video summing junction 42 which also receives a video signal from a switch 44 which may selectively be closed so as to apply a cursor signal on a line 46, which is generated in the timing and control circuitry 32 as is described more fully with respect to FIG. 5 hereinafter. With the switch 44 closed, the cursor signal will generate a partial grid work, illustrated by the solid line 48 in the video display 38, which permits mutual alignment of the optical fiber bundles 28 with the field of view of the vidicon camera 30 such that the spots 50 of lightness presented by the optical fiber bundles 28 will be more or less centered within the boxes defined by the cursor display 48. Naturally, the video display 38 is controlled in a fashion similar to the control of the vidicon camera by digital clocking signals which control its horizontal and vertical synchronization and unblanking, provided by the timing and control circuitry 32 of FIG. 4, as is described more fully hereinafter.

Referring to the illustrations set forth on the video display 38 in FIG. 2, the vidicon camera 30 scans from left to right across substantially its entire field of view. Each scan is subdivided (for convenience, as is explained hereinafter) into 130 horizontal clock signals, of which 109 (0–108) represent the unblanked, active portion of the scan, although only 96 of these horizontal clock signals (0–95) actually represent the horizontal window within which the processor is responsive to the output of the vidicon camera; the remainder (above 108) being blanked time, at which the horizontal sweep is restored to the left side as viewed in FIG. 2. Similarly, vertical clock signals, produced by the timing and control circuitry 32 of FIG. 4 in response to the horizontal clock signals, causes vertical sweep to be unblanked for 240 vertical clock signals (each of which contain the 130 horizontal clock signals) the remainder of the vertical sweep (20 vertical clock signals) being blanked time in which the vertical sweep is restored to the top of the field of view (as viewed in FIG. 2).

As is shown in the illustration of the video display 38, the digital clock signals subdivide the active portion of the vidicon camera field of view into 24 squares, each aligned to contain the image 50 of one of the twenty-four optical fiber bundles 28 which, in turn, is responsive to one of the twenty-four optical sensing stations 26. Thus each of the squares in the display corresponds to one of the bottles. However, it is not necessary that any one or any group of the squares be particularly related to any one or a group of the bottles (such as four-packs of six bottles each) since any bottle can be assigned to any of the 24 processing channels, the relationship between the bottle and the channel simply being that it has suitable delay from label edge detection to the desired stopping position of the bottle, which delay can readily be provided for any bottle as it described with respect to FIG. 6 hereinafter. For purposes of illustration herein, the horizontal lines which compose one frame during a single vertical sweep are clustered in three groups of sixty four and one group of forty eight, and identified as rows 1 through 4. Thus row 1 contains lines 0–63, and so forth. Each row, and the entire frame, are also subdivided by horizontal timing bits into six columns of elements (elements herein referring to the resolution of the processor as it responds to the continuous video presented on the line 40 by the vidicon camera 30). That is, during each of the horizontal clock times (0–95) for each horizontal scan of the vidicon camera 30, there are 96 samplings of the vidicon camera video on the line 40. These samplings are referred to as elements 0–95, such that: column 1 consists of elements 0–15; column 2 consists of elements 16–31; and column 6 consists of elements 80–95. The columns and their constituent elements and the rows and their constituent lines are used to identify signals which occur at commensurate times in response to the digital clocking signals. Thus a signal identified as "first element" occurs at times commensurate with horizontal clock signals 0, 16, 32, 48, 64, 80 and 96. Similarly, a signal identified as "last lines" means the last line in each of four rows, generated by vertical clock signals 63, 127, 191 and 239; similarly "first lines" consists of vertical clock signals 64, 128, 192 and 240.

Figure 7:
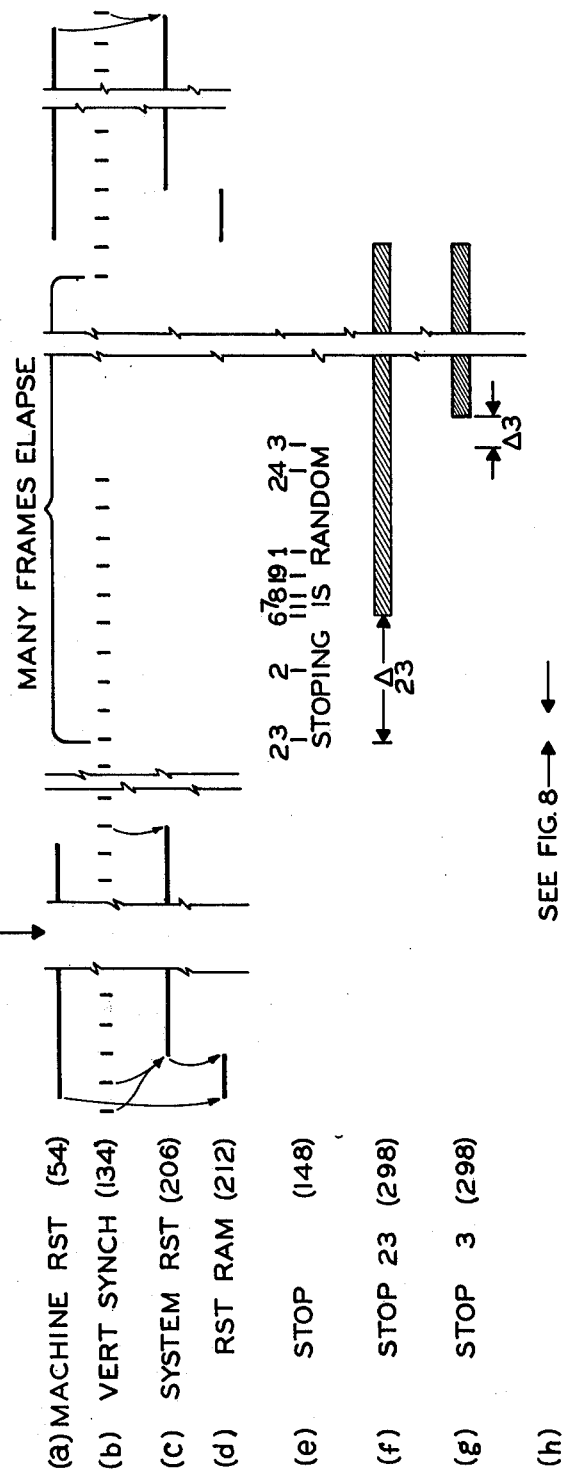
FIG. 7 is a timing diagram illustrative of an overall cycle of detecting the orientation and selectively stopping the packages being mutually oriented for packaging in a cluster package.

The general operation of the system is illustrated in the timing diagram of FIG. 7. Synchronization between the conveyor 16 (FIG. 2) and the electronic processing circuitry of the present invention is achieved by means of a machine reset signal on a line 54 as shown in illustration (a) of FIG. 7. When the assembly 18 clears a current set of bottles, and is restored upstream along the conveyor so that it may engage another set of bottles 10, it provides the machine reset signal on the line 54. Although many functions continue to operate in the processing circuitry of the present invention, nothing meaningful occurs as is described more fully with respect to FIGS. 3 and 4 hereinafter. Because of the fact that the basic frame rate of the present embodiment is based upon the vertical scan rate and therefore on the vertical synchronization signal generated for the vidicon camera (illustration (b)) of FIG. 7, which occurs approximately at 60 Hz or every 16.7 milliseconds, and the time for restoring the assembly 18 may be on the order of several seconds, there are many vertical synchronization signals generated defining many vidicon camera frames during the machine reset signal on the line 54. As the machine reset signal appears on the line 54, the random access memory of the system is preset as shown in illustration (d) of FIG. 7. With the occurrence of the second vertical synchronization following the appearance of the machine reset signal on line 54, a system reset signal is generated as shown in illustration (c) of FIG. 7, which in turn ends the presetting of the random access memory. Although the digital clock continues to run in the electronic processing apparatus, nothing happens therein until the end of the machine reset signal on line 54 (illustration (a) of FIG. 7); then, the very next vertical synchronization signal (illustration (b)) causes the end of the system reset (illustration (c)) at which time system operation begins. Since the bottles may be in any position when the system reset signal ends, there is no way of telling how long (how many electronic frames, determined by vertical synchronization signals) it will take before all the bottles have their label edges sensed and their stop signals generated; but it must take at least eight frames to acquire a sufficient history on any bottle since an 8-bit pattern is utilized in the present embodiment. In any event, depending upon the arbitrary rotation of the bottle at the time the bottle is picked up and its ultimate desired position, the sensing of the label edges and generating of the stop signals occurs on a random and arbitrary basis. In the present embodiment, there is sufficient time in the movement of the bottles along the conveyor with the assembly 18 engaging them, to ensure that all bottles will rotate sufficiently (up to a one and a half full revolutions) to be sensed and stopped in the proper position. When the conveyor has advanced to the position at which the assembly 18 disengages from the bottles, a new machine reset signal (illustration (a) of FIG. 7) will be generated causing resetting of the random access memory (illustration (b)) and generation of the system reset (illustration (c)). Once the assembly 18 has engaged a new set of bottles, the spinning, sensing and stopping will again be repeated.

Figure 8:
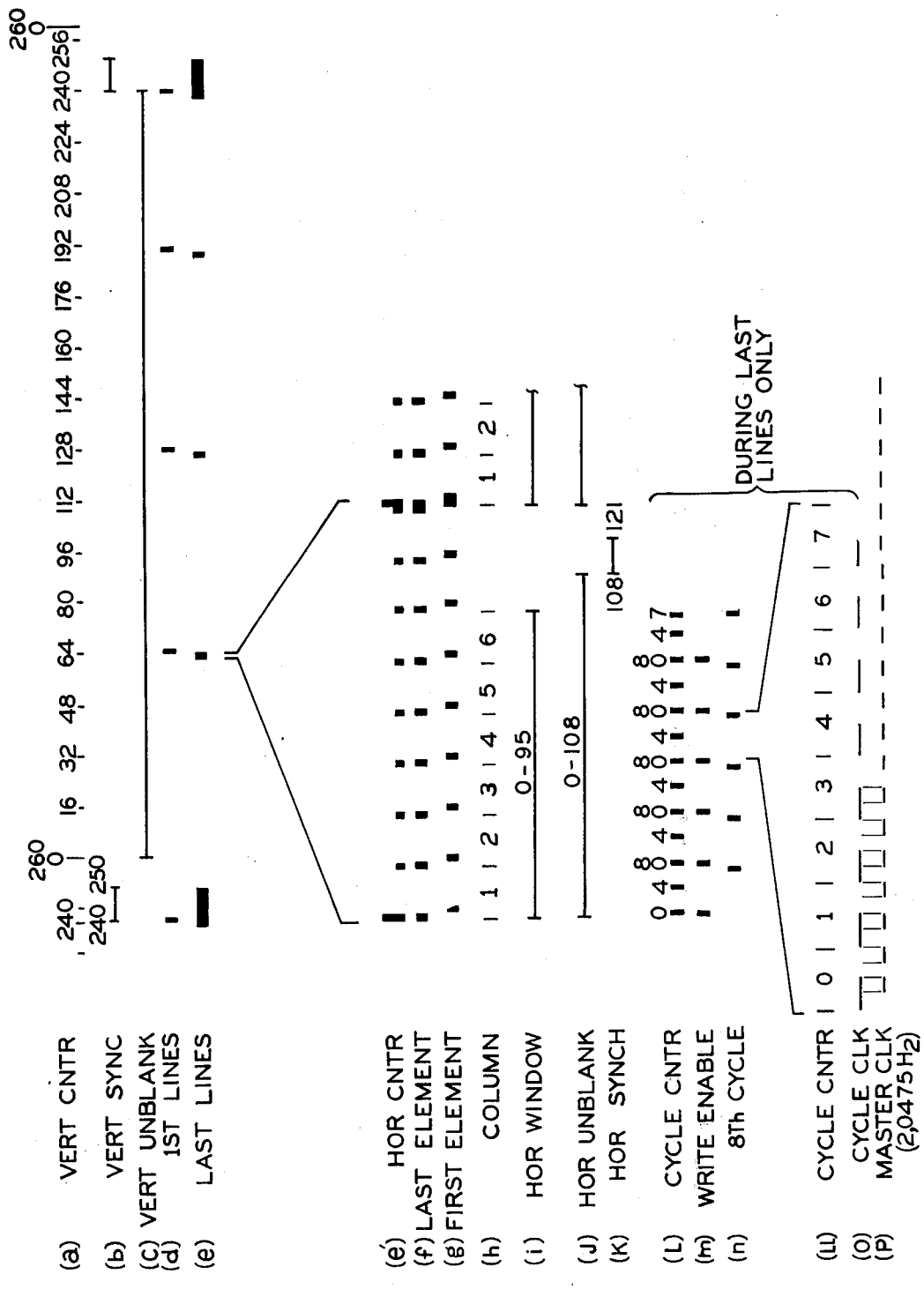
FIG. 8 is a timing diagram illustrative of the timing within the embodiment of FIG. 1.

Referring now to FIG. 3, a first element signal (illustration (g), FIG. 8) on a line 56 is generated during horizonal clock signals 0, 16, 32, etc. (as seen in FIG. 2 and shown in illustration (e') of FIG. 8) and presets an element counter 58 in response to switches 60 which connect suitable voltage of a source 62 to the preset inputs of the counter in a known fashion to control the count required in the counter 58 before it will generate its terminal count signal on a line 64. With the timing involved in the embodiment shown herein, as few as two or three light spots may be seen by the vidicon camera as the result of each of the bundles of optical fibers. Therefore, the counter 58 may comprise a four-bit open-ended binary counter preset to a count of two; or it may be a four-bit binary counter preset to a count of fourteen. As the vidicon continuously generates video, it is presented on the line 40 to a threshold detector 64 which will present a signal on its output line 66 only during periods of time in which the magnitude of the video signal on the line 40 is in excess of a threshold magnitude which is taken to be the cutoff point between black and white or dark and bright. The voltage on the line 66 is sampled by a D-type flip flop 68 in response to a master clock signal (illustration (p), FIG. 8) on a line 70, which establishes the basic element resolution and bit-rate in the system. That is, it is the master clock that determines the manner in which the horizontal sweeps are broken up into individual elements (0-95) as shown in the video display 38 of FIG. 2. That it is, that the threshold detected video is synchronized to the electronics of the system by the D-type flip flop 68. The output of the flip flop is supplied on a line 71 to an enable input of an element counter 58 such that whenever the counter is enabled, the next master clock signal on the line 70 will advance the counter 58 by one count. If the particular column of the row being scanned in fact has a bright spot in it, then a terminal count will be achieved on the line 64 which is applied to one enable input of each of six counters 72-74, the other enable input of which is connected to a respective column select line 76-77 such that only the one of counters 72-74 related to a particular column now being scanned by the vidicon camera will be enabled. If the enable signal is present on the line 64, then the master clock signal on the line 70 will advance the count of the selected one of the counters 72-74 by one count. In a fashion similar to the counter 58, each of the counters 72-74 is preset in response to a last lines signal on a line 86 by switches 84 connected to the source 62 so as to control the number of counts which must be received by the counter 72-74 in order for them to count through their terminal count and return to zero. As an example, as the horizontal scanning proceeds across all of the columns, successive lines at a time, until all the lines of the row (and therefore all the scanning relating to the six bottles associated with the row) have been scanned, brightness may appear in any one of the images 50 in about ten lines. Therefore, on the order of ten counts in any one of the counters 71-74 should have caused it to advance to a terminal count and be reset to zero (the counters 71-74 being closed-ring). Thus, the counters may comprise 16-bit counters which are initially preset to a count of six or seven. When any of the counters 72-74 have advanced from its terminal count to zero, it provides a negative transition at a corresponding output line 92-94 which is used at the clock input of a related D-type flip flop 96-98, the D inputs of which are always enabled by connection to a suitable source of voltage 99. The D-type flip flops are reset at the start of each row of squares (FIG. 2) by a first lines signal on a line 100 which is generated in response to vertical count 0, 64, 128 and so forth. The output of the D-type flip flops are supplied to an addressable multiplexer 102 which is responsive to three column count signals on a plurality of lines 104 to address the multiplexer 102 in a fashion such that each of the D-type flip flops is connected through to the output line 106 of the multiplexer 102 within the corresponding column during the last line of the current row.

Summarizing the upper portion of FIG. 3, as the vidicon camera sweeps horizontally across successively lower vertical lines, it sweeps across the vidicon camera field of view areas allocated to six bottles in each horizontal sweep, for 64 (48 in the last row) horizontal sweeps until completion of a row and, therefore, completion of sweeping of the areas of all six bottles. In each horizontal sweep, the threshold detector 64 and element counter 58 determine whether enough occurrences of brightness have been sensed to designate that horizontal scan through the area of the related bottle as bright or dark; if determined to be bright, it is stored in a line counter relating to that column; after all scans of a row (relating to the six bottles), each of the six line counters 72-74 either have or have not sensed enough bright elements, presented thereto by the element counter 58 for the related bottle, to consider that bottle to have lightness. If it has, an overflow of the counter has clocked the related D-type flip flop so as to buffer the fact of lightness in one of the D-type flip flops 96-98.

During last lines (lines 63, 127 . . . 239), a first cycle signal is generated once for each of the six columns, which provides the sampling rate for storing a group of bits, one for each bottle. This signal is presented on a line 108 to an OR circuit 110 to provide a write enable signal on a line 112, which enables a random access memory (RAM) 114 to write a data bit into a bit position thereof designated by the address presented on a plurality of address lines 116 from an address counter 118. The storable input to the RAM 114 is presented on the line 120 from an OR circuit 122, which at this time is responsive to the output of the multiplexer on the line 106. In other words, the multiplexer will present, during last lines, the manifestation of lightness (when the same has been lodged in one of the D-type flip flops 96-98) to an addressed position in the RAM 114. As is described more fully hereinafter, operation of the RAM and subsequent processing apparatus (that is, other than that in the upper portion of FIG. 3 and some of the counting circuits in FIGS. 4 and 5) is responsive to a cycle clock which divides each of the columns into eight portions (rather than the sixteen elements utilized in the upper portion of FIG. 3). These eight portions correspond to eight complete cycles of operation (eight frames of vertical scanning of the vidicon camera), including the current cycle and seven previous cycles, so that after the bottles have been monitored for some time, a history of eight bits, consisting of four dark bits (which may for instance be binary ZEROS) followed by four light bits (which may for instance by binary ONES), will identify the edge of the label, as described hereinbefore. The cycle clock that generates the first cycle signal on the line 108 also presents seven more cycle clock signals on a line 124 for each column, for a total of forty-eight cycle clock signals spread across all six columns during the last lines (lines 63, 127, etc.). The cycle clock signals on the line 124 advance the memory address counter 118 once for each cycle clock signal. Thus, during the first cycle related to each column, the content of the D-type flip flop 96-98 related thereto will be stored in an address in the RAM, and is also available during the second half of that same cycle, at the output 126 thereof, for presentation to an exclusive OR circuit 128, the other input to which on a line 130 is provided by an eight-bit shift register 132 which is similarly advanced by the cycle clock signals on the line 124. As indicated, the shift register 132 is connected for closed-ring operation so that the content thereof continues to move therethrough in a caterpillar fashion, closing on itself from the end to the beginning every eighth cycle. The shift register is preset in response to a vertical synchronization signal on a line 134 in response to a plurality of switches 136 connected to a suitable source 138 so as to present a pattern 00011110 thereto at the beginning of each frame. Because the shift register 132 is closed-ring operated, this pattern will continuously present itself every eight cycles. In response to the initial cycle clock signal on the line 124, which coincides with the first cycle signal on the line 108, the RAM address counter 118 and the shift register 132 will both be advanced; due to the delays inherent in the circuitry which generates the first cycle signal on the line 108, it will not quite occur until after the edge of the cycle clock signal on the line 124 which advances the RAM address counter 118 and the shift register 132. Therefore, as the first bit is written into RAM 114 in response to the write enable signal on the line 112, the RAM address counter will have already incremented by one, and the shift register will have advanced by one so that it then has stored therein a pattern of 00001111; in the second half of the cycle, the bit which has just been stored in the RAM is compared in the exclusive OR circuit 128 with the bit which is now in the last stage of the shift register 132. If they are alike, nothing happens; but if they are different, this will enable the J input of a JK flip flop 140 so that the very next one of the cycle clock signals on the line 124 will cause the flip flop to become set, so that the NOT Q output on a line 142 will disappear. The JK flip flop 140 is assured to be in the reset conditioned (with a signal at its NOT Q output 142) at the start of each column of each of the last lines by applying the write enable signal on the line 112 to a reset input thereof. Thus, if there is a difference between the bit output of the RAM 114 (the history) and the bit output of the shift register 132 (the desired pattern), the flip flop 140 will become set, thereby blocking the input on the line 142 to an AND circuit 146 so that a stop signal on the line 148 cannot be generated in response to an eighth cycle signal on a line 150. On the other hand, if the bits on the line 126 and 130 are alike, then the exclusive OR circuit 128 will have no output so that the J input to the flip flop 140 will not be enabled, and since the K input of the flip flop 140 is maintained enabled by voltage from a suitable source 52, the clocking of the flip flop 140 causes it to remain with the NOT Q output on the line 142 present, so that a stop signal can be generated. However, the sampling in the eighth cycle by the line 150 is only after a set of eight brightness-indicating bits relating to one bottle have been read from RAM 114 and compared to the entire content of the shift register 132. This is in response to advancing of the count in the RAM address counter 118 by the cycle clock signals on the line 124, so that just after the first bit is written into RAM 114 from the multiplexer 102, the RAM address counter continues to advance and therefore reads out the next higher-addressed seven bits of RAM 114 onto the line 126, in sequence, for comparison with successive ONES of the shift register outputs, which are advanced at the same time. Sampling takes place only after eight bits have been read from RAM (the first one being the bit which has just been read into RAM) for comparison with the shift register, after which the eighth cycle signal on the line 150 will sample the condition of the flip flop 140 at the AND circuit 146. If eight signals have been read out which compare exactly with the content of the shift register, the exclusive OR circuit 128 will not have presented the signal to the flip flop 140 so that it will have remained in the reset state, and the signal on the line 142 will be present during the eighth cycle. This will permit the AND circuit 146 to generate the stop signal on the line 148 to indicate that the bottle should be stopped. In any other case (which of course is the more prevalent case, since all cycles in all of the frames previous thereto would have mismatches; it is only upon the condition of the label edge having been sensed four cycles earlier that the patterns can match), the exclusive OR circuit will provide an output to the J input of the flip flop 140 causing it to become set, which remains until the start of the next column during the same last line (e.g., column 2 of line 63). Completion of the entire last line (for instance, line 63 in FIG. 2) ends the operation of the RAM, the shift register and the flip flop 140, since the cycle clock will no longer operate for the next sixty-three lines; during this period of time, sampling of the optical patterns in the vidicon camera by the apparatus in the upper portion of the FIG. 3 resumes, to determine lightness or darkness for each of the columns in row 2.

Figure 5:
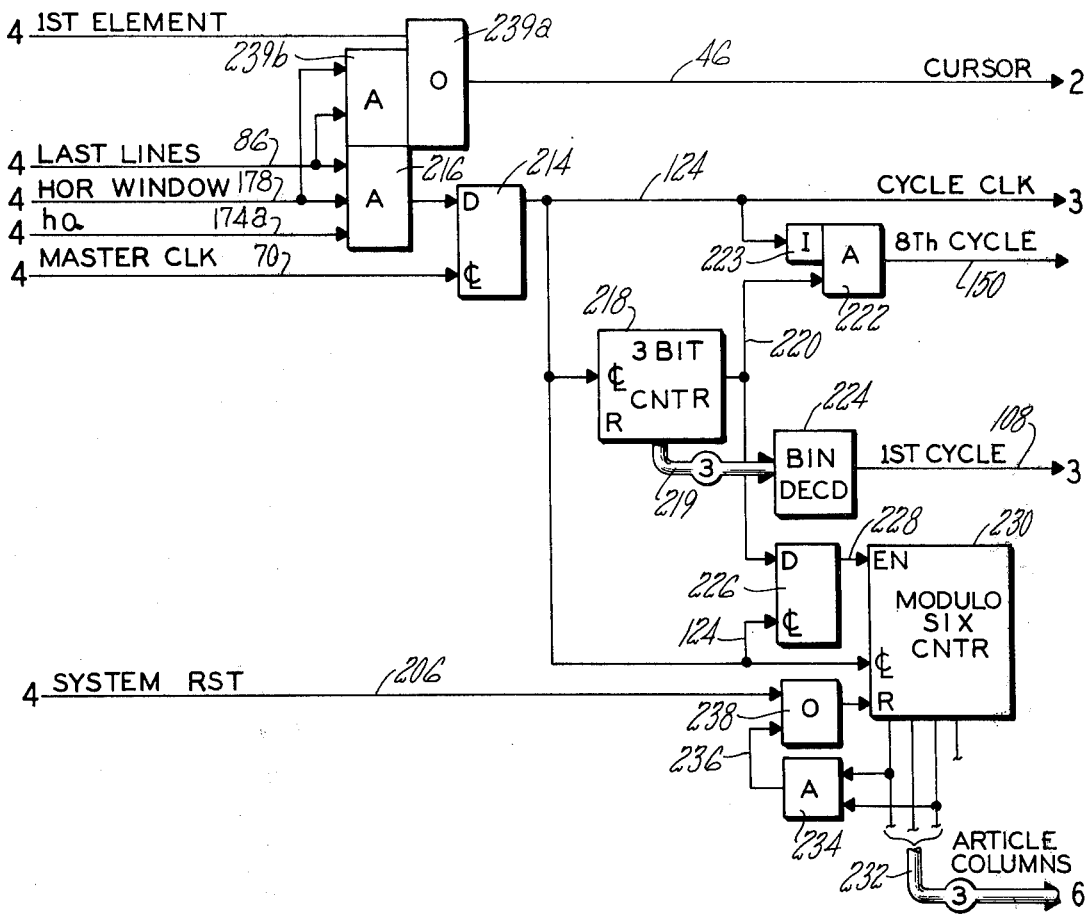
FIG. 5 is a schematic block diagram of timing and controls, particularly cycle controls, for the embodiment of FIG. 1.

The electronic clock circuitry which provides timing and control for the present embodiment consists essentially of a digital clock and decoding circuitry related thereto as shown in FIGS. 4 and 5. In FIG. 4, the basic timing of the entire system is derived from a 2.0475 MHz oscillator 160, which provides the mster clock signals on the line 70. In addition, signals are applied to a four bit counter 162 which comprises the low order half of the horizontal counter 164, and the terminal count of which is operatively connected by a line 165 to a four bit counter 166 which comprises a high order half of the horizontal counter 164. The terminal count of the counter 162 appears for each 16 elements, and therefore represents the last element of each column (see FIG. 2). It is delayed by one master clock in a D-type flip flop 167 to provide the first element signal on the line 56.

The individual outputs of the horizontal counter 164 ($h0$–$h6$) are utilized to generate signals for controlling the operation as described hereinbefore. Specifically, the columns (illustration ($h$), FIG. 8) are defined simply by the high order signals ($h4$–$h6$) which comprise the column count signals on the line 104 and are presented to a binary encoder 168 to generate the column signals on the line 76–78. In addition, the presence of the lowest order and highest order bits ($h0$, $h7$) are sensed in an AND circuit 170 to recognize a count of 129 and present a signal on a line 172 which resets both of the counter portions 162, 166 to all ZEROS. This provides a counter of modulo 130 (having counts 0–129), which is found in the present embodiment to be convenient to provide a sufficient horizontal window (horizontal count 0–95) for scanning the vidicon camera with the desired resolution, which additionally provide the necessary control functions between each horizontal sweep. The high order horizontal bit signals on the lines 104 are applied together with the low order horizontal bit signals on a trunk four lines 174 to a binary decode circuit 176 which generates three different signals in response to the count represented by the horizontal counter 164. For instance, there is generated a horizontal window signal (illustration ($i$), FIG. 8) on a line 178 throughout horizontal counts 0–95; a horizontal unblank signal (illustration ($j$), FIG. 8) on a line 180 throughout counts 0–108; and a horizontal synchronization signal (illustration ($k$), FIG. 8) on a line 182 during horizontal counts 108–121. The horizontal window (as is seen in FIG. 2) simply defines the portion of each horizontal line in which the electronic system is responsive to the scanning of the vidicon camera 30. The horizontal unblank signal on the line 180 is applied to the vidicon camera 30 and to the video display 38 (if one is used) to control the horizontal sweep thereof, as is the horizontal synchronization signal on the line 182 which, however, is also used to operate a vertical counter 184 (FIG. 4).

The vertical counter 184 comprises a nine bit binary counter which is advanced once for each horizontal synchronization signal on the line 182; the output of its individual stages ($v0$–$v8$) on a trunk of nine lines 186 are applied to a binary decode circuit 188 so as to generate various vertical control signals as described hereinafter. The lowest order, the second lowest order, and the highest order stages ($v0$, $v1$ and $v8$) of the binary counter 185 are monitored by an AND circuit 190 so as to generate a signal on a line 192 whenever a count of 259 is sensed by the AND circuit 190 in order to reset the counter 185 to all ZEROS. This provides operation modulo 260 (0–259) which is found to be convenient to provide the desired vertical sweep with the digital subdivision of frames as described herein.

The binary decode circuit provides vertical unblanking for all of the 240 lines by generating a vertical unblank signal on a line 194 during vertical counts 0–240. It also generates the first line signals on the line 100 during vertical counts 64, 128, 192 and 240. On lines 196–199, the binary decode 188 respectively generates article row signals 1–4 during vertical counts 63, 127, 191 and 239, all of which are presented to an OR circuit 200 along with the vertical synchronization signal on the line 134 (generated during vertical counts 240–250), so as to generally provide the last lines signal on the line 86 during each of the last lines of each row as well as during the vertical synchronization at the end of the frame.

The vertical synchronization signal (illustration ($b$), FIG. 7) on the line 134 is supplied to the clock input of a D-type flip flop 202, the D input of which is connected to the machine reset signal (illustration ($a$), FIG. 7) on the line 54, so that the machine reset signal will be set into the D-type flip flop 202 in response to the first vertical synchronization signal on the line 134 following the appearance of the machine reset signal on the line 154. The output of the D-type flip flop 202 is applied to the J input of a JK flip flop 204 which is also clocked by the vertical synchronization signal on the line 134. Thus, once the flip flop 202 is set, the next vertical synch signal will clock it into the JK flip flop 204 so that it will generate the system reset signal (illustration ($c$), FIG. 7) on a line 206 two vertical synchs following the appearance of the machine reset signal on the line 54. When the machine reset signal disappears from the line 54, an inverter 208 provides a signal to the J input of the JK flip flop 204 so that the next vertical synch signal on the line 34 will toggle the JK flip flop 204 since it has signals at both the J and K inputs thereof. This will cause the system reset signal on the line 206 to disappear one vertical synch signal following the disappearance of the machine reset signal on the line 54.

An AND circuit 210 is responsive to the absence of system reset, since it is connected to the NOT Q output of the JK flip flop 204, and to the presence of the machine reset signal on the line 54 to generate a reset RAM signal (illustration ($d$), FIG. 7) on a line 212 at the very beginning of each machine reset signal on the line 54. This is applied in FIG. 3 to the two OR circuits 110, 122 to cause an all ONES condition to be applied to the input line 120 of the RAM 114 while concurrently generating the write enable signal on the line 112 so that the RAM is preloaded with ONES at the beginning of each reset period.

In FIG. 5, cycle clock signals (illustration (o), FIG. 8) are generated to control cycles which repetitively compare the histories stored in RAM and the current bright-/dark conditions of each of the bottles to the desired pattern. Specifically, the master clock signal on the line 70 is utilized at the clock input of a D-type flip flop 214, the D input of which is provided by an AND circuit 216 in response to concurrent presence of the h0 signal on a line 174a, which represents the low order bit of the horizontal counter, concurrently with the presence of the last lines signal on the line 86 and the horizontal window signal on the line 178. This means that the D-type flip flop 214 is turned on with the negative edge of the master clock (half way through the master clock signal) during the active vertical portion of each of the last lines (lines 63, 127 and so forth), once for every other master clock signal (due to the h0 input). This generates the cycle clock signal on the line 124 at half the rate of the master clock and one half master clock delayed therefrom. The cycle clock, as described hereinbefore, therefore divides each of the last lines (lines 63, 127, 192 and 239) into 48 cycle clock periods. The cycle clock signals on the line 124 are applied to a three bit cycle counter 218 which delineates, by its terminal count on the line 220, the eighth cycle relating to each column, and since it is applied to an AND circuit 222, the other input of which is the complement of the cycle clock signal as presented by an inverter 223, generates the eighth cycle signal (illustration (n), FIG. 8) on the line 150 only during the last half of the last cycle per bottle. The output of the cycle counter 218 is also applied on a trunk of three lines 219 to a binary decoder 24 which decodes the first of the eight cycles to present the first cycle signal on the line 108. The terminal count on the line 220 is also applied to the D input of a D-type flip flop 226, the clock input of which is connected to the cycle clock signal on the ine 124, to provide a signal on a line 228 one cycle clock signal following the eighth cycle for each column; this is used to enable a modulo six counter 230 which is advanced in response to the cycle counter in order to generate article columns signals on a trunk of three lines 232 to identify the six different bottles in a row, in order to demultiplex the stop signals generated in FIG. 3 for operation of the clutches 21 (FIG. 2), in a manner described hereinafter. The low order and the next to high order outputs (bits 0 and 3) are provided to an AND circuit 234, the output of which on the line 236 designates a count of five which is passed through an OR circuit 238 to reset the modulo six counter 230 to ZEROS, whereby the modulo six counter 230 can comprise four bit binary counter while counting modulus six. The counter is also reset to zero during the presence of the system reset signal on the ine 206.

At the top of FIG. 5, the cursor signal on the line 46 is developed by an OR circuit 239a in response to the first element signal on the line 56, or in response to an AND circuit 239b for each of the horizontal window portion of each of the last lines. This provides the cursor 48 on the display 38 (if one is used) and can be used to assist in aligning the fiber bundles 28 with the vidicon camera 30.

Figure 6:
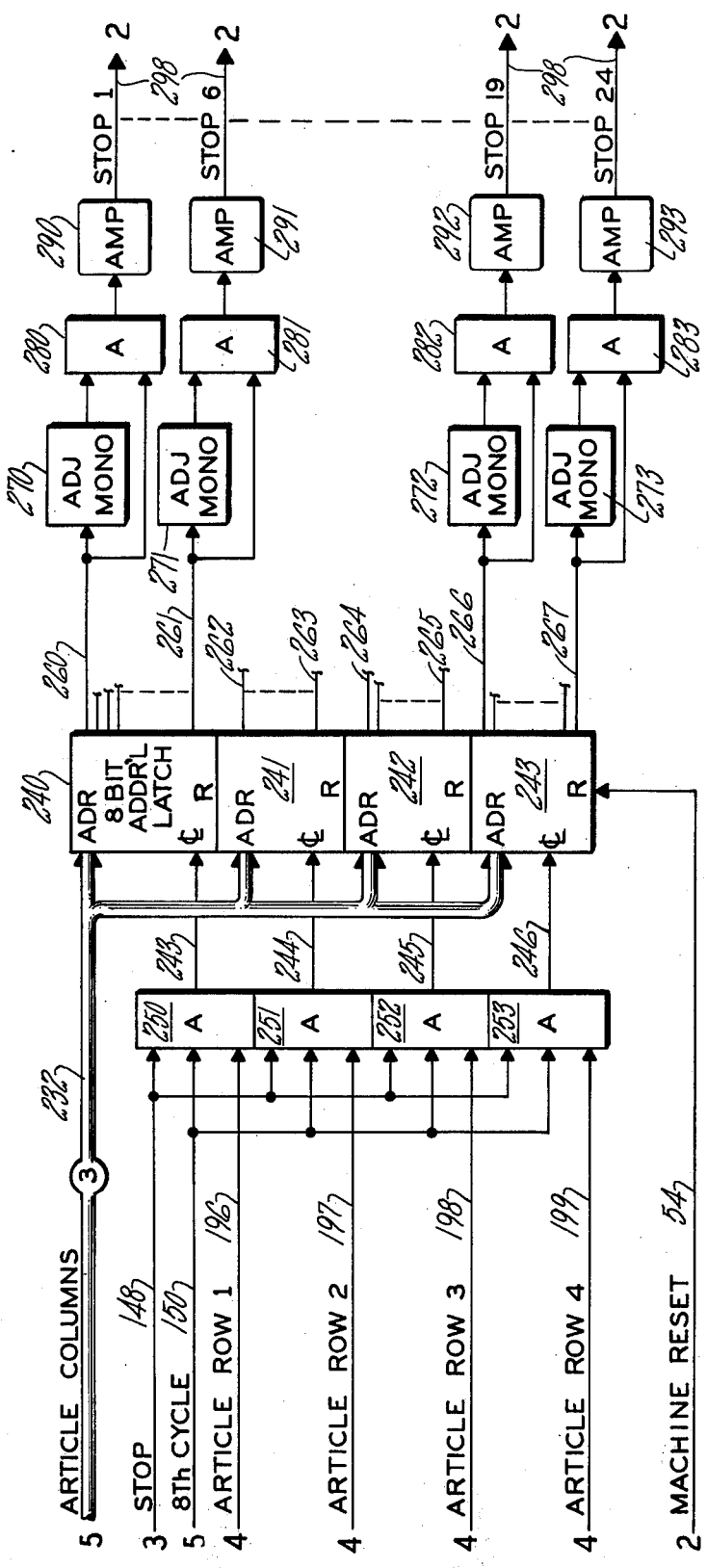
FIG. 6 is a schematic diagram of demultiplexing, delay and driving circuitry for the embodiment of FIG. 1.

In FIG. 6, the article columns signals on the lines 232 are applied to the address inputs of four, eight-bit addressable latches 240-243. These may be simple bistable devices arranged in clusters of eight, the inputs thereto being steered by binary logic in response to the address inputs, or they may comprise eight-bit addressable latches which are obtainable in integrated circuit form from a number of suppliers. The latches 240-243 are all reset between cycles by the machine reset signal on the line 54. Thereafter, any given latch can be set whenever it is addressed and a shift appears in the signal on a related line 243-246, concurrently. These signals are generated by respective AND circuits 250-253 in dependence upon the selective presence of the article row signals on the lines 196-199 concurrently with the presence of the stop signal on the line 148 (indicating that some bottle has been determined to soon be stoppable) and the eighth cycle signal on the line 150 (which designates the last half of the eighth cycle for each bottle) during the last lines, as is described with respect to FIG. 5 hereinbefore. Thus, during the last lines (lines 63, 127, etc.), if a stop signal is generated indicating that there has been an eight bit pattern match to the data coming from RAM at the end of the related column (the eighth cycle), the one of the eight bit addressable latches relating to the particular row which has just been scanned by the vidicon camera (see FIG. 2) would be enabled, and the particular one of the eight bit addressable latches therein designated by the modulo six count on the article columns lines 232 will have the stop manifestation on the line 148 set therein. Once set, any one of the addressable latches 240-243 will provide, at a respective output line illustrated by output lines 260-267, a signal which is applied to an adjustable monostable multivibrator 270-273 and a corresponding AND circuit 280-283 so that, after a delay determined by the adjustment of the related monostable multivibrator 270-277, the corresponding AND circuit 280-287 will provide a signal to a related amplifier 290-293, to generate an individual, distinct stop signal for the corresponding one of the twenty-four clutches 21 (FIG. 1) on a corresponding one of the twenty-four distinct lines 298. Once any given one of the addressable latches 240-243 has been set, it will continuously present a signal on a related one of the lines 260-267 so that the corresponding AND circuit 280-287, following time out of the related monostable multivibrator 270-277, will continuously present the stop signal (illustrations (f) and (g), FIG. 7); however, once the related clutch has been operated so that the bottle has been stopped, the presence of the signal is immaterial. These signals will continue to be presented until the resetting of the addressable latches 240-243 by the machine reset signal on the line 54, which occurs after all bottles have had an opportunity to be properly oriented.

The embodiment described hereinbefore with respect to FIGS. 1-8 employs a vidicon camera, with the field of view thereof divided for allocation to 24 different bottles. For each bottle, light is presented to the corresponding area of the vidicon camera by a related light pipe consisting of a bundle of optical fibers; because the vidicon camera is defocused with respect to each fiber bundle, the vidicon camera sees a general spot of light relating to the entire bundle of optical fibers, rather than individual discrete small spots relating to each individual fiber bundle. This provides the opportunity for accepting the pattern presented to the vidicon camera as either lightness or darkness in its entirety with respect to the bottle at each scanning of the vidicon camera, which in turn avoids problems which may result from flaws in the vidicon camera which could give erroneous readings over small areas of the vidicon camera field of view. In the embodiment described hereinbefore, the utilization of a single spot representing the entire bundle of optical fibers for each bottle permits redundant scanning with respect to each bottle which in turn also overcomes difficulties that might otherwise be encountered as a consequence of flaws in the vidicon camera. In this embodiment, this is achieved by successive samplings at the master clock rate during each horizontal scan through any given area and a commensurate setting of the white element counter, together with successive horizontal scans in the same spot area with the results thereof being accumulated in the line counter. This is an important aspect of the present invention.

In the embodiment of FIGS. 1 through 8 described hereinbefore, the pattern is limited to sensing of a label edge wherein the bottle is assumed to show as darkness but the labeled portion of the bottle is assumed to show as brightness. Obviously, this could be reversed, such as if the bottle were light and the label were dark, or if the opposite edge of the label were sensed. Furthermore, although an 8-bit pattern of four dark bits followed by four bright bits has been disclosed, the pattern could have sixteen or some other number of bits, and in fact could accommodate a variable pattern of bright and dark bits relating to imprinting on the label.

A second embodiment of the invention does not employ a vidicon camera, but utilizes discrete photo detectors for each bottle in place of the optical fiber bundles, and employs means facilitating recognition of a far more complex optical pattern. This second embodiment finds particular application in the case of containers having full labeling thereon (unlike typical bottles on which the label may cover only 120° of the periphery), such as beverage-containing cans for beer and soda and the like. In such a case, the detecting of the label edge is less useful since a can may be printed throughout its entire periphery (resulting in there being no label edge), and the recognition of a unique pattern which appears only at one point throughout the label may require a far larger number of bits than for simple edge detecting.

Figure 9:
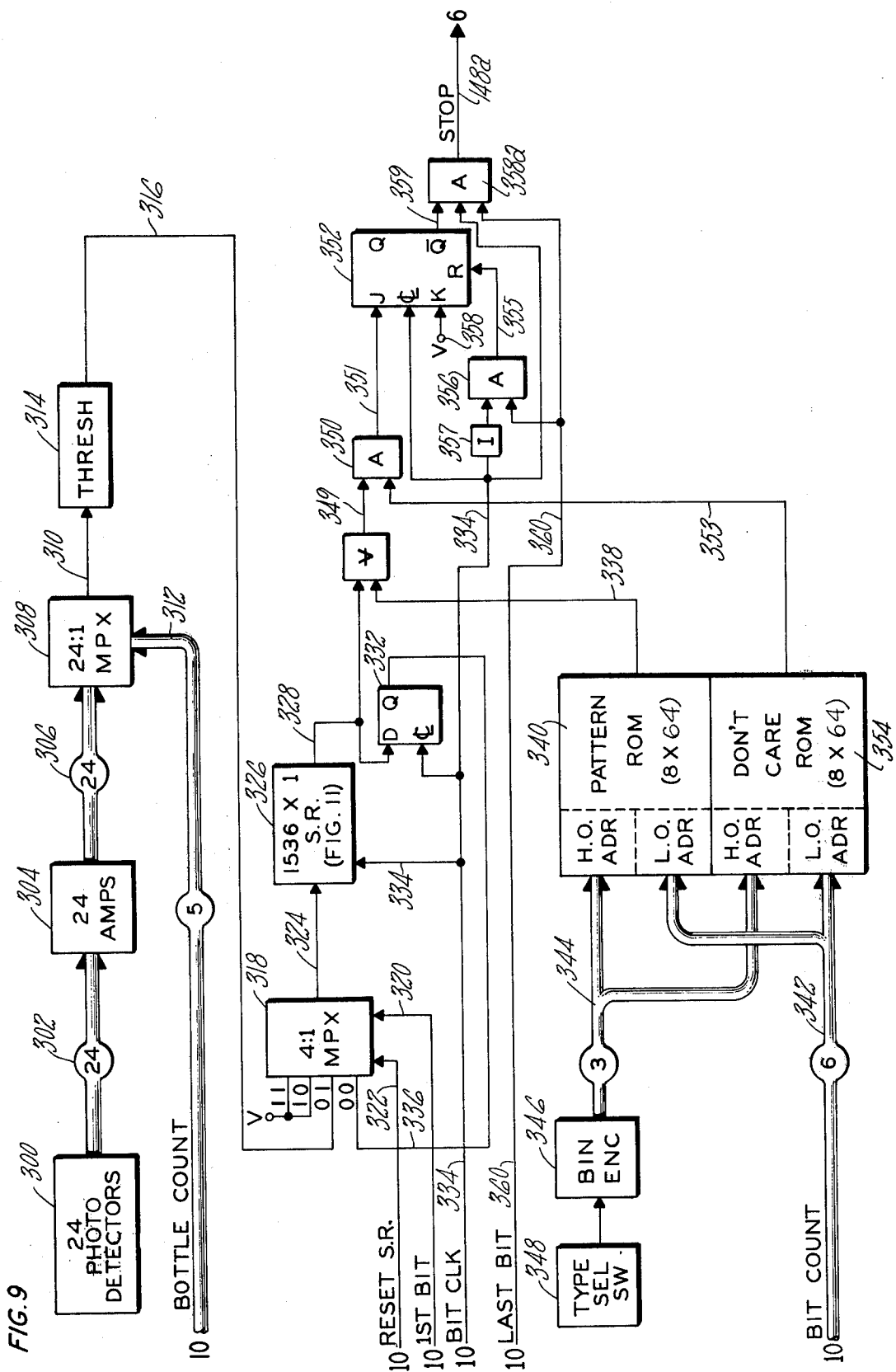
FIG. 9 is a schematic block diagram of another embodiment of the invention, employing photocells.
Figure 10:
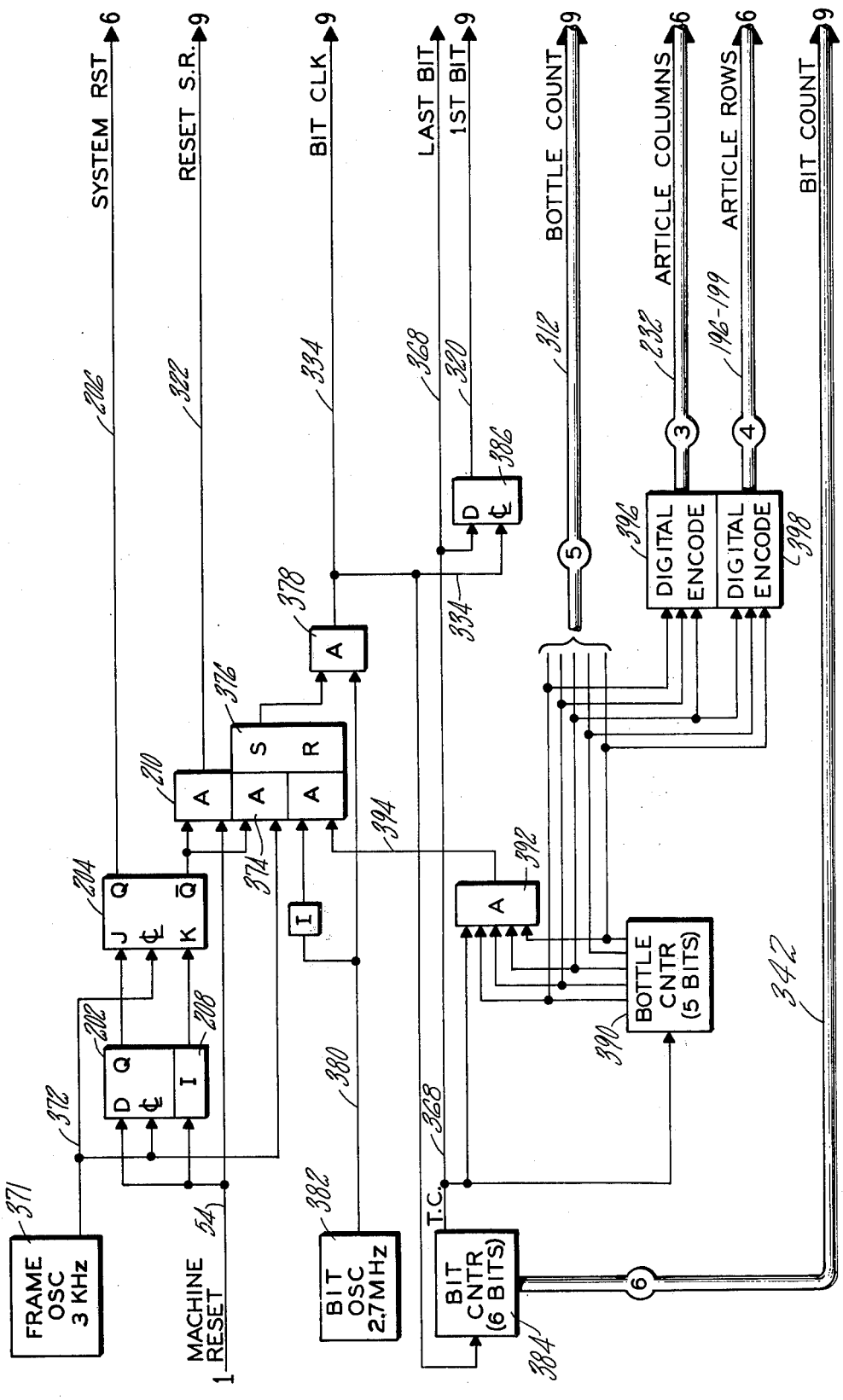
FIG. 10 is a schematic block diagram of timing control circuitry for the embodiment of FIG. 9.

Referring now to FIG. 9, an alternative embodiment of the invention employs 24 photodetectors 300, each of which relates to one of the 24 containers which are prearranged in clusters for cluster packaging in four six-packs, and which are to be rotated until a particular position of the label is sensed with respect to a desired position so that the containers may be stopped with their label indicia pointing in the desired directions (in the same fashion as in the prior embodiment herein). Each photodetector provides an electric signal on a corresponding one of twenty-four lines 302 to a related amplifier 304, the outputs of which are provided by a trunk of lines 306 to a multiplexing switch 308. The multiplexing switch 308 must selectively connect any one of the twenty-four lines 306 to a single output line 310; the multiplex switch 308 may comprise a 32:1 multiplex switch, only two-thirds of which is utilized, or it may comprise three 8:1 multiplex switches together with a binary decode circuit to select the enable input of one of the three multiplex switches in response to the two highest order bits of an address provided thereto, which in this case comprises bottle count signals on a trunk of five lines 312 (which are developed as described with respect to FIG. 10 hereinafter). All of this is within the skill of the art. The selected signal on the line 310 is provided to a threshold circuit 314 which in turn will provide a data signal on a line 316 in response to a signal of sufficient magnitude to indicate that the photodetector has sensed brightness in contrast with darkness at the related bottle. Thus, the line 316 presents a sequence of signals relating to successively different containers.

The data is serially stored and compared with the pattern in the same fashion as is described hereinbefore, except that the serial storage is provided in a slightly different manner, and the pattern is assumed herein to be a variable pattern of 64 bits. The use of 64 bits permits sensing of a complex lightness/darkness pattern on the label of a can, defined by the actual product identification indicia printed on the can (or any other form of container), in contrast with the label edge sensing of the prior embodiment. As in the prior embodiment, the modulus of the serial storage is one greater than the modulus of the data so that the serial storage provides data on a last-in/first-out basis, each complete frame of data (a 64bit history for each of 24 bottles) dropping off the oldest data bit with respect to each container and adding the newest data bit at the front end of the data relating to that particular container.

This is achieved in FIG. 9 by applying the serial data bits relating to all of the bottles, on the line 316, to a 4:1 multiplex switch 318 which is controlled by two address bits (in the well-known fashion), the low order of which comprises a first bit signal on a line 320 and the high order of which comprises a reset shift register signal on a line 322. The first bit signal being present on the line 320 (which occurs only when the reset shift register signal is not present on the line 322) causes the line 316 to be selected (with the address 01) to provide an output on a line 324 as the data input to a 1536-bit shift register 326 which is only one bit wide. Thus the shift register 326 can contain an entire frame of data consisting of 64 bits for each of twenty-four containers. As the shift register 326 is advanced, each bit at its output 328 is compared in an exclusive OR circuit 330 in the same fashion as described with respect to FIG. 3 hereinbefore, and as is described more fully hereinafter. The output on the line 328 is also applied to the D input of a D-type flip flop 332 which is clocked at the same rate as the shift register 326 by a bit clock signal on a line 334. Thus the flip flop 332 comprises an additional stage of shift register which, however, the exclusive OR circuit 330 does not see. Thus the shift register storage capability is one higher in modulus than the modulus of a complete frame of data. The output of the D-type flip flop on a line 336 is applied to the zero address input of the four to one multiplexer 318. Thus, whenever the first bit signal is not present on the line 320 and the reset shift register signal is not present on the line 322, the 4:1 multiplex switch 318 will connect the output of the D-type flip flop 332 to the input 324 of the shift register 326 circulates, its output bit is returned through the D-type flip flop 332 and the multiplex switch 318 to its input, except when the multiplex switch responds to the first bit signal on the line 320 to connect the line 316 to the input 324; in such case, the oldest data bit (in the D-type flip flop 332) is lost and a new data bit is supplied by the line 316 to the group of 64 data bits relating to any individual container. In fact, the first bit signal on the line 320 occurs once for each 64 bit-clock signals on the line 334, as is described more fully hereinafter with respect to FIG. 10.

The exclusive OR circuit 330 compares the shift register output on the line 328 with a sequence of signals on a line 338 from the output of a pattern read-only memory (ROM) 340, which provides a selected one of eight possible 64 bit patterns. The low order address input of the pattern ROM 340 is controlled by bit count signals on a trunk of six lines 342, which correspond in sequence to the 64 bits of the pattern and, therefore, to the 64 bits of history circulating (and being updated) in the shift register 326 with respect to each of the containers. Thus, as the bit count (described more fully with respect to FIG. 10 hereinafter) advances from zero through 63, cyclically, it causes successive bits of a desired pattern to be read out of the ROM 340 onto the line 338 for comparison with the 64 successive bits relating to each container as applied to the output of the shift register on the line 328. The pattern ROM 340 also has a high order address input portion responsive to a trunk of three lines 344 which represent the binary equivalent, provided by a binary encoder 346, of the current setting of a type selector switch 348, which may be manually operated to select any one of eight patterns relating to different types of containers which may be processed by this embodiment. For example, if the apparatus is used in conjunction with machinery which is packaging different types of soft drinks in cans, the different labeling relating to the different flavors may require different patterns from the ROM 340, and these patterns can be selected by high order addresses in response to the selection switch 348 which can specify the different flavors of soft drink which may be processed.

Whenever the exclusive OR circuit 330 has mismatched inputs, it will provide an output signal on a line 349 to an AND circuit 350 which will normally pass that signal on a line 351 to the J input of a JK flip flop 352. However, since the registration of labels on containers and the relative sizes of various portions of a label may vary in accordance with permissible tolerances thereof, and since no synchronization between the exact placement of the container with respect to the phase of the processing circuitry herein is provided, it is possible for the actual transitions of brightness and darkness on the labels being sensed to vary anywhere up to a full clock pulse one way or the other. Thus, the pattern of the history bits have one or more bad bits in it, and therefore never match the pattern in the ROM 340. To accommodate this, the present embodiment provides a "don't care" bit on a line 353, which is negative or logical ZERO when the portion of the pattern being read out from the pattern ROM 340 is in the vicinity of a light-to-dark or dark-to-light transition, which blocks the AND circuit 350 thereby making the flip flop 352 insensitive to any differences between the history data on the line 328 and the pattern data on the line 338. The "don't care" signal on the line 353 is provided by a "don't care" ROM 354 which is addressed exactly the same as the pattern ROM 340. In fact, the ROMs 340, 354 may obviously comprise a single two-bit wide ROM, one bit comprising the pattern and the other bit comprising the "care" and "don't care" information with respect to that bit of the pattern, as to all 64 bits of each pattern stored therein. Obviously, in any case where there is a "don't care" bit (ZERO) to block the AND circuit 352, the logical state (ONE or ZERO) of the corresponding bit of the pattern is immaterial.

The flip flop 352 is reset by the last bit signal on a line 360 being passed to a line 355 by an AND circuit 356 in response to a not-clock signal from an inverter 357. It is thereafter clocked by the falling edge of the bit clock signal on the line 320. Due to a source 358 connected to the K input, the flip-flop is maintained in the reset state and the NOT Q output provides a signal on a line 364, until the AND circuit 350 provides a signal to the J input as a result of a mismatch. An AND circuit 358a samples the NOT Q output of the flip flop 352 on a line 359 in response to a last bit signal on a line 360 concurrently with a bit clock signal on the line 334; no signal will be provided on a stop signal line 370 if the flip flop 352 has been set by a mismatch. Stated alternatively, in order for the JK flip flop 352 to indicate that the container should be stopped, the AND circuit 350 has to have not presented any signal to the J input throughout comparison of the entire sixty four bits of the pattern. If the exclusive OR circuits 330 provides no output signal except when the AND circuit 350 is blocked by "don't care" bits, then the JK flip flop 352 will remain in the reset state so that the AND circuit 358a can supply the stop signal on the line 148a at the end of the pattern in response to the last bit signal on the line 360.

The digital clock for the present embodiment is considerably simpler than that of the embodiment described hereinbefore. This is so because the horizontal and vertical scanning as well as the vidicon camera synchronization does not have to be accommodated. Specifically, overall timing is under control of a relatively slow frame oscillator 371 which may be on the order of 3 KHz. The output of the frame oscillator 371 via line 372 is functionally equivalent to the vertical synch signal on the line 134 in the embodiment of FIGS. 1 through 8. This signal controls circuitry 202-210 which is also responsive to the machine reset signal 54 to generate the system reset signal on the line 206 in the same fashion as is described with respect to FIG. 4 hereinbefore, and to generate the reset shift register signal on the line 322 (in the same fashion as is the reset RAM signal on the line 212, hereinbefore). It is also used to operate an AND circuit 374 so that, for each frame other than during system reset, a bistable device 376 will become set, thereby enabling an AND circuit 378 to gate clock signals on a line 380 from a much faster bit oscillator 382, which may be on the order of 5.39 MHz, to provide the bit clock signal on the line 334.

The bit clock signal on the line 334 activates a 6-bit counter 384, the terminal count of which comprises the last bit signal on the line 368. This is delayed one bit time in a D-type flip flop 386 to generate th first bit signal on the line 320. It is also utilized to advance a 5-bit bottle counter 390, the output of which comprises the bottle count signals on the lines 312, which identify each successive one of the twenty-four containers which are being sensed. Thus, the bottle count is advanced by one every 64th bit clock signal on the line 334. The outputs of all stages except the next-to-highest order stage of the bottle counter 390 are applied to an AND circuit 392 along with the terminal count indication on the line 368 so as to generate a bit 1535 signal on a line 394 indicating that a complete frame of data bits has occurred, which resets the bistable device 376 and blocks the output of the bit oscillator 382 from generating any further bit clock signals on the line 334. This causes the present embodiment to assume a quiescent state in which it will remain until the next output of the frame oscillator 370 dictates th start of another frame of data signals. If the bit clock is running at the time that the machine reset signal appears on the line 54, it is immaterial since that signal cannot appear until after a time when all possible stop signals will have been generated by the apparatus of FIG. 9, as described with respect to the embodiment of FIGS. 1 through 8 hereinbefore. In other words, after all stop signals are generated, signal processing may continue through many, many frames prior to the machine reset signal, which in turn causes the system reset and shift register reset, but all of this is immaterial since all the bottles will have been stopped and the bottle stopping mechanism will therefore be immune to any signals which may be generated. Once the machine reset signal disappears, so that system reset signal disappears from the line 206 (as described with respect to FIG. 4 hereinbefore), the very next frame oscillator signal on the line 371 will again set the bistable device 376 so as to recommence signal processing. The difference in frequency between the frame oscillator 371 and the bit oscillator 382 is not critical. In fact, for end-to-end processing of an entire frame of 1536 bits of data contiguous with a subsequent entire frame, the frame oscillator may have a frequency 3509.12 Hz; however, processing is fast enough so that this is not critical. The oscillator frequencies shown herein allow a sampling rate such that 64 bits can span approximately one inch with roughly 15 mil resolution, which is equivalent to at least four samplings across a vertical component major letters or symbols of beverage containers, with containers spinning at about 200 revolutions per minute.

The output of the bottle counter on the lines 312 is also applied to a pair or digital encode circuits so as to generate the article columns signals on the line 232 and the article rows signals on the lines 196-199 for application to FIG. 6, if desired. Alternatively, the addressing arrangement of the latches in FIG. 6 may be altered to a simple binary fashion so as to be able to respond directly to the bottle count signals on the lines 312, if desired.

Although the invention has been shown and described with respect to a preferred embodiment thereof, it should be understood by those skilled in the art that the foregoing and various other changes, omissions and additions therein may be employed without departing from the spirit and scope of the invention.

Having thus described a typical embodiment of our invention, that which we claim as new and desire to secure by Letters Patent is:

1. Apparatus for sensing the rotary orientation of a plurality of illuminated, labeled containers, each rotating at a respective station, comprising:
   a plurality of light responsive means, one for each station, each providing intensity signal manifestations of light intensity of respective areas through which successive portions of the peripheral surface of the related container pass as the container rotates at the corresponding station;
   sampling means responsive to said light responsive means for sampling said intensity signal manifestations and providing brightness-indicating signals representative of the sampled intensity of said intensity signal manifestation being in excess of a given magnitude;
   memory means responsive to said sampling means for storing said brightness-indicating signals in groups, each group including brightness-indicating signals relating to all of the containers within a given time period, and for reading out the stored brightness-indication signals in sets, each set including brightness-indicating signals relating to one of said containers stored during said time period and a plurality of similar, contiguous, preceding time periods;
   stop means responsive to said memory means for testing each set of signals read out of said memory means for compliance with a desired pattern and for providing a stop signal related to the orientation of the container when a set of signals conforms to the desired pattern; and
   a plurality of delay means, one for each of said stations, each responsive to said stop means to provide an output signal after a pre-established delay from the time of generating said stop signal in response to the testing of a corresponding one of said sets of signals, said pre-established time delay being related to the relative position of the related one of said light responsive means and the desired rotary orientation of the container thereat.

2. Apparatus according to claim 1 wherein each of said delay means is independently adjustable.

3. Apparatus for sensing the rotary orientation of a plurality of illuminated, labeled containers, each rotating at a respective station, comprising:
   a vidicon camera;
   a plurality of optical means, one for each station, each providing intensity signal manifestations, of light intensity of respective areas through which successive portions of the peripheral surface of the related container pass as the container rotates to related areas within the field of view of said vidicon camera;
   digital clock means for providing a plurality of time-related sequences of controlling signals, said digital clock means providing vertical synchronizing signals and horizontal synchronizing signals, without offset, to said vidicon camera to provide a non-interlaced scan thereof in which the horizontal scan lines are at the same position in each vertical scan; and
   digital processing means responsive to said vidicon camera and to said digital clock means for processing the signal output of said vidicon camera in groups relating to distinct areas of the field of view of said vidicon camera delineated by selected ones of said digital clocking signals, to provide output signals respectively relating to the rotary orientations of the containers.

4. Apparatus for sensing the rotary orientation of a plurality of illuminated, labeled containers, each rotating at a respective station, comprising:
   a vidicon camera;
   a plurality of optical means, one for each station, each providing intensity signal manifestations, of light intensity of respective areas through which successive portions of the peripheral surface of the related container pass as the container rotates to related finite areas in the field of view of said vidicon camera;
   an analog threshold detector responsive to the video output of said vidicon camera;
   a gate responsive to said threshold detector and said digital clocking means to provide element signals timed with said controlling signals whenever said vido output exceeds said threshold magnitude;
   an element counter for counting said element signals and providing a line signal in response to a count of a determined number of said element signals in each horizontal scan of one of said finite areas;
   a plurality of line counting means, each for counting the number of said line signals generated for different ones of said finite areas in successive horizontal scans thereof, and for registering a data signal in response to a given count therein;

multiplexing means for sampling said line counting means in sequence to provide a series of data signals relating to a corresponding group of said stations;

memory means responsive to said multiplexing means for storing said data signals in groups, each group including brightness-indicating signals relating to all of the stations within a given time period, and for reading out the stored data signals in sets, each set including data signals relating to one of said stations stored during said time period and a plurality of similar, contiguous, preceding time periods, on a last-in/first-out basis, the read out of each of said sets being completed between storing of successive ones of said series of data signals;

testing means responsive to said memory means for testing each set of signals read out of said memory means for compliance with a desired pattern and for providing a stop signal related to the orientation of the container at related station when a set of signals conforms to the desired pattern; and demultiplexing register means responsive to said testing means for individually registering said stop signals for each of said stations.

5. Apparatus according to claim 4 further comprising:
a plurality of delay means, one for each of said stations, each responsive to said demultiplexing register means for providing output signals delayed from said stop signals by amounts related to the desired rotary orientation of a container at the corresponding station.

6. Apparatus according to claim 5 wherein said testing means comprises:
stop generating means for normally generating, in the absence of a blocking signal presented thereto, said stop signal once for each set of signals read from said memory means; and
means responsive to disparity between any one of the signals of said pattern and the related one of the set of signals read out of said memory means concurrently therewith for providing a blocking signal to said stop generating means, thereby to block the generation of said stop signal.

7. Apparatus according to claim 4 including:
a digital clock means for providing a plurality of time-related controlling signals to mutually synchronize operation of said vidicon camera, said threshold detector, said gate, said element counter, and said line counter with said multiplexing means, said memory means said testing means and said output means; and wherein:
said memory means is operated in response to said digital clock means in a serial fashion; and
said testing means includes means to serially present signals representing said desired pattern serially, in synchronism with the serial read-out of said memory means under control of said digital clock means.

* * * * *